United States Patent [19]

Van Auken

[11] 4,065,150
[45] Dec. 27, 1977

[54] SKI AND METHOD OF MAKING SAME

[75] Inventor: Richard L. Van Auken, Bridgewater, N.J.

[73] Assignee: Exxon Research and Engineering Company, Linden, N.J.

[21] Appl. No.: 652,331

[22] Filed: Jan. 26, 1976

[51] Int. Cl.² ............................................. A63C 5/12
[52] U.S. Cl. .................................. 280/610; 156/228; 264/257
[58] Field of Search ............... 280/610, 602, 601, 603, 280/609, 608, 607, 606, 600; 264/257; 156/228, 330

[56] References Cited

U.S. PATENT DOCUMENTS

| 2,184,791 | 12/1939 | Broome | 280/610 |
| 2,213,903 | 9/1940 | Davidson | 280/610 |
| 2,428,325 | 9/1947 | Collins | 280/610 X |
| 2,470,227 | 5/1949 | Wheeler | 280/610 |
| 2,634,136 | 4/1953 | Tribelhorn | 280/610 |
| 2,695,178 | 11/1954 | Rheinfrank, Jr. | 280/610 |
| 2,920,898 | 1/1960 | Metcalfe et al. | 280/610 |
| 3,201,138 | 8/1965 | Brown, Jr. | 280/610 |
| 3,210,230 | 10/1965 | Tyhurst | 156/228 |
| 3,276,784 | 10/1966 | Anderson, Jr. | 280/610 |
| 3,904,813 | 9/1975 | Groff | 156/330 X |

FOREIGN PATENT DOCUMENTS

| 1,241,437 | 8/1960 | France | 280/610 |
| 1,925,327 | 11/1970 | Germany | 280/610 |
| 394,004 | 11/1965 | Switzerland | 280/610 |
| 327,764 | 3/1958 | Switzerland | 280/610 |
| 1,224,177 | 3/1971 | United Kingdom | 280/610 |

Primary Examiner—Joseph F. Peters, Jr.
Assistant Examiner—Milton L. Smith
Attorney, Agent, or Firm—Joseph J. Dvorak

[57] ABSTRACT

A method of making a novel ski having viscoelastic properties is disclosed. The ski is composed of continuous reinforcing fibers embedded in a matrix of an elastomer modified syntactic plastic foam. The fibers are arranged so as to be at an angle of 0° and 90° with respect to the longitudinal axis of the ski.

17 Claims, 4 Drawing Figures

SKI AND METHOD OF MAKING SAME

BACKGROUND OF THE INVENTION

1. Field of the Invention

The invention relates to the art of skis and methods for making the same. Indeed, this invention has for its principal object the production of a composite ski material which greatly improves the quality of the ski.

2. The Prior Art

There have been innumerable attempts to improve the strength and durability of skis without the loss in the requisite flexibility of the skis and without increasing the weight or altering the geometry of the skis beyond the preferred weight and geometry for optimum performance. One very typical approach to improving ski strength involves reinforcing wood laminae with glass fiber reinforcing materials. Representative, but certainly not all inclusive of such approaches, are the following: U.S. Pat. No. 2,213,903; U.S. Pat. No. 2,470,227; U.S. Pat. No. 2,428,325; U.S. Pat. No. 2,634,136; U.S. Pat. No. 2,184,791.

Recent attempts in improving the quality of skis has centered around the use of composite materials and structures, particularly composite materials employing plastics. Representative of these attempts are the following: U.S. Pat. No. 2,695,178; U.S. Pat. No. 2,920,898; U.S. Pat. No. 3,201,138; U.S. Pat. No. 3,276,784 and French Pat. No. 1,241,437.

In spite of the large growth of these fabrication techniques the resultant skis still have major shortcomings such as decreasing flexibility and performance with increasing strength and loss of dampening characteristics. Indeed, an excessive number of component parts employed in some skis results in skis that do not have the requisite durability.

SUMMARY OF THE INVENTION

In general, the present invention provides improved skis constructed from a material which has viscoelastic properties. Particularly, the ski of the present invention is composed of a ski body comprising a composite material of continuous reinforcing fibers embedded in a matrix of an elastomer modified plastic foam. These continuous reinforcing fibers are oriented at a predetermined angle of orientation with respect to the longitudinal axis of the ski body. Preferably, the reinforcing fiber consists of woven glass which is so arranged in the ski body as to have the fibers in the glass fabric at an angle of 0° and 90° with respect to the longitudinal axis of the ski.

In another aspect, the present invention relates to a ski body formed from laminated structural material comprising a plurality of plies of alternating laminae of continuous fibers and laminae of foam resin. The fibers are oriented at an angle of 0° and 90° with respect to the longitudinal axis of the ski and the foam resin is a syntactic foam resin.

In another embodiment of the present invention there is provided a method of producing a reinforced foamed resin ski which has great flexibility and relatively low weight and relatively great strength.

These and other embodiments of the present invention, and indeed important features and advantages other than those which have been mentioned above, will become apparent when consideration is given to the following details and description, which when taken in conjunction with the annexed drawings, describes, discloses, illustrates and shows the preferred embodiment of the present invention and what is presently considered and believed to be the best mode of practicing the principles thereof.

THE DRAWINGS

DETAILED DESCRIPTION

Figure 1:
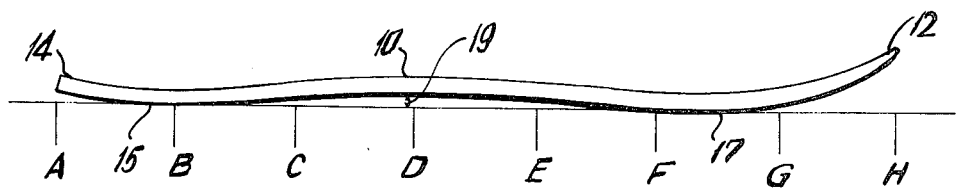
FIG. 1 is a side elevation of a ski in accordance with the present invention shown in lengthwise relation to a scale having stations marked off along the scale length.
Figure 2:
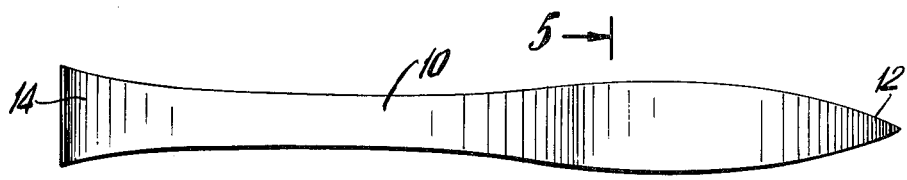
FIG. 2 is a top plan view of FIG. 1.

Referring now to the drawings in general and more particularly to FIGS. 1 and 2, the ski body has an elevated flat portion 10, known as the pedestal, which forms the bearing point for the foot of the wearer, an upturned toe portion 12 and heel portion 14. The general surface 15 and 17 on the underside of the ski where the ski touches the ground during use is referred to generally as the running surface of the ski. The distance from the ground to the underside of the pedestal shown in FIG. 1 by reference numeral 19 is referred to as the camber. Thus, as can be seen in FIGS. 1 and 2, the general contour of the ski of the present invention follows the general shape of skis known in the art.

Basically, the ski body is composed of built-up layers of continuous reinforcing fibers. The continuous fibers that can be used in the practice of the present invention are any of the typical fibers employed in reinforcing resin materials, such as carbon fibers, graphite fibers, glass fibers, boron fibers and the like. Particularly preferred in the practice of the present invention, however, are the fibers of glass fibers. Indeed, it is especially preferred in the practice of the present invention that the fiber layers be woven fibers and most preferably that they be woven fiberglass fibers.

Figure 3:
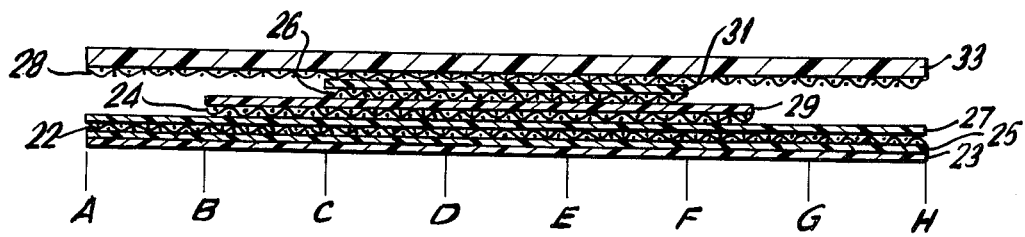
FIG. 3 shows the preferred number of fiber layers, their relative length with respect to the longitudinal axis of the ski.

FIG. 3 shows diagrammatically a number of woven fiberglass fabric layers 22, 24, 26 and 28. It should be noted that these individual layers of laminae of fibers are arranged in relation to each other such that exterior surfaces of the ski body have a full length of fiber-reinforcing material whereas the interior comprises laminae of incrementally shorter lengths extending from the center of the ski to the extremeties. Interposed between the fiber reinforcing layers are layers of foam resin 25, 27, 29 and 31. An additional top layer of foam resin 33 and a bottom layer 23 are provided. The additional bottom layer 23 of foam resin provides a surface that can be machined, for example, to accommodate installation of metal edges. As can be seen in FIG. 3, the top resin layer 33 and the two bottom resin layers 23 and 25, run the full length of the ski whereas the remaining resin laminae are of incrementally shorter lengths extending from the center of the ski to the extremeties. These materials are arranged in alternating laminae of fiber and resin.

Among the foam resin suitable in the practice of the present invention are foamed resin materials such as elastomer modified epoxies, polypropylene and nylon. Particularly preferred in the practice of the present invention are condensation products of expichloro hydrine and bisphenol-A modified with carboxylterminated polybutadiene acrylonitrile rubber.

In the practice of the present invention, it is particularly preferred in order to have the requisite strength and weight of the ski that the resin be a cellular foam structure. Foams of the foregoing type typically are foamed by means of glass microballoons or carbon microballoons included in the resin. These foams are referred to generally as syntactic foams. In the present invention, glass microballoons are preferred. Generally the amount of glass sphere or microballoons in the resin will be in the range of about 5 wt. % to about 30 wt. % and preferably about 12 wt. % based on the total weight of resin.

In order that the resin material have the requisite strength it also is desirable to reinforce the syntactic foam with chopped fibers such as boron, carbon, graphite and glass fibers. In the practice of the present invention, it is particularly preferred that the syntactic foam be reinforced with chopped glass fibers. Indeed, it is particularly preferred that the amount of chopped glass fibers range between 5 to 30 wt. % based on the total weight of syntatic foam resin.

Although a wide variety of resin materials can be used in the present invention, it is particularly preferred that the resin material be one which has a cured density in the range of about 0.75 to 1.0 gm/cc and preferably 0.80 to 0.95 gm/cc. The preparation of resin compositions of the above type forms no part of the present invention. Indeed, it is particularly preferred to use commercially available materials such as syntactic foam resin sold under the tradename of Narmco 7850 by the Narmco Division of Celanese Corporation, New York.

The thickness especially preferred for the various laminae run in the order of from about 0.050 inches to 0.100 inches. Indeed, with respect to the thickness for the continuous fiber-reinforcing layer, the preferred thickness is between about 10 mils and 20 mils in thickness; and, the syntactic foam layer is preferably about 60 mils to 90 mils in thickness.

Figures 4, 5:
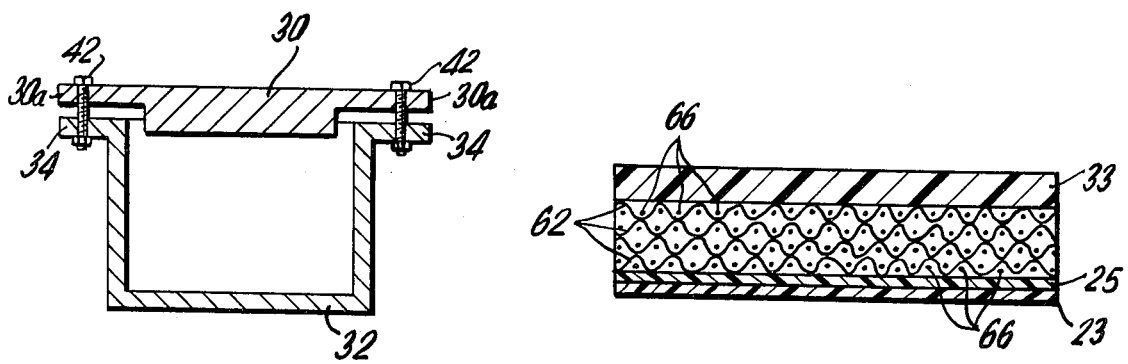
FIG. 4 is a cross-section of a mold suitable in forming a ski of the present invention.
FIG. 5 is a cross-section taken along line 5—5 of FIG. 2.

In FIG. 4 is shown cross-section of a mold suitable for forming a ski in accordance with the present invention. As can be seen, the mold has a base portion 32 and a top 30 which are provided with side flanges 30a and 34. Flanges 30a and 34 are provided with holes through which connecting bolts 42 can be used to firmly fix the top of the mold in place for applying pressure on the materials set within the mold during curing. The mold, of course, should have the requisite contour, such as that shown in FIG. 1. It should be noted that it is preferred that the ski be given the proper camber indicated at 19 in FIG. 1; however, it should be noted also that it may be found desirable in some instances to eliminate the camber. In high performance racing skis the proper camber is highly desirable.

It is a very important feature of the present invention that the continuous reinforcing fibers be oriented in the ski at a predetermined angle of orientation with respect to the longitudinal axis of the ski. Indeed, it is especially preferred that the continuous reinforcing fibers be oriented at 0° and 90° with respect to the longitudinal axis of the ski. Moreover, approximately equal amounts of fibers are oriented at 0° and at 90°. It should be appreciated, therefore, that the use of a structural woven glass fabric is particularly suitable in the practice of the present invention. Thus, as can be seen in FIG. 5, the ski body has fibers 62 which are oriented at 90° with respect to the longitudinal axis of the ski and fibers 66 which are oriented at 0° with respect to the longitudinal axis of the ski.

In making the ski from woven fabric such as woven fiberglass and from laminae of elastomeric syntactic foam sheet material, the sheet material is cut into the appropriate width and length. As can be seen from FIG. 3, the lengths of fiberglass layers 28 and 22 are the same; so too is the length of syntactic foam 23. However, the remaining layers are shorter.

In making a ski from woven fabric such as fiberglass and from an elastomer modified syntactic foam resin, sheets of resin and fiberglass are placed in a mold in alternating fashion such as shown in FIG. 3.

Advantageously, the woven fiberglass fabric can be placed on top of a sheet of syntactic foam resin of comparable length and width and thereafter the requisite size working pieces are cut from this two component sheet of resin and reinforcing fiber.

As mentioned previously, in forming skis according to the present invention a mold is employed which has the requisite contour. This mold will be at least as wide as one pair of skis and preferably the mold will be the width of three pairs of skis.

To make a 78 inch long pair of skis, a mold 78 inches long and 24 inches wide having the desired ski contour is first lined on the mold bottom with a mold release agent such as a commercially available parting sheet or even a silicone release agent. Then layers 23 and 25 of elastomer modified syntactic foam are placed in the mold completely covering the bottom. Layers 23 and 25 are followed by a 24 inch wide and 78 inch long composite layer of foam and reinforcing fiber. In FIG. 3 this is shown as fiber layer 22 followed by foam layer 27. The next composite layer of foam and fiber reinforcement (shown in FIG. 3 as layers 24 and 29) is cut to extend from heel station B, for example, to station F, for instance. The next composite layer is cut to extend, for example, from heel station C to station F, i.e., as measured from the heel end. This procedure is continued so as to build the pedestal where desired and to provide the ski with the preferred ski profile. The last two layers or laminae of material (layers 28 and 33 of FIG. 3, for example) placed in the mold, however, are cut to extend the full length of the ski. Typically, the ski billet will be about 13 plies although the number of plies at the heel and toe portions of the ski will be only about 2 or 3 plies. In any event, the mold is closed and the foam resin is cured at a temperature of about 250° to 300° F. Thereafter, the billet is removed and cut in a plane perpendicular to the horizontal layers of fiber and foam into 3 matching pairs of skis.

Optionally and preferably the bottom of each ski is machined to accommodate metal edges. Also, a layer of ultra high density polyethylene is bonded to the bottom of the ski with a standard two part epoxy adhesive, for example. Finally, an acrylonitrile butadiene styrene terpolymer sheet material is bonded to the top of the skis, with an epoxy adhesive, for cosmetic purposes.

As should be readily appreciated, the process of the present invention provides pairs of skis in which the properties of each ski in a pair are identical. This is particularly important for the most proficient competition skiers. Additionally, the process of the present invention permits design of skis having specific bending and torsional characteristics. More importantly, however, the present invention provides a ski body which consists of a homogeneous viscoelastic structural material and which is totally load bearing. The singleness of structure and the resiliency of this ski body provides a ski which has high dampening characteristics. Vibrational dampening is an exceedingly important feature in skiing control and speed. Also, the ski body of this invention is highly fatigue resistant.

What is claimed is:

1. A ski comprising a ski body formed from a laminated structural material having a plurality of plies of alternating laminae of reinforcing fibers and elastomer modified syntactic foam, said fibers being continuous glass fibers oriented at 0° and 90° with respect to the longitudinal axis of the ski, said elastomer modified syntactic foam being selected from the group consisting of syntactic epoxy, polypropylene and nylon foams containing about 5 wt. % to 30 wt. % glass microballoons and having a cured density in the range of about 0.75 to 1.0 gm/cc, whereby said ski has viscoelastic properties.

2. The ski of claim 1 wherein the reinforcing fiber is woven glass fabric.

3. The ski of claim 1 wherein the elastomer modified foam is an epoxy foam.

4. The ski of claim 3 wherein the elastomeric foam contains from about 5 wt. % to 30 wt. % of chopped fibers.

5. The ski of claim 4 wherein the chopped fibers are selected from carbon, boron, silicon nitrite and glass fibers.

6. The ski of claim 5 wherein the chopped fibers are glass fibers.

7. A ski body having a pedestal and a head and toe section, said ski body comprising: a plurality of plies of alternating laminae of woven fabric and elastomeric modified syntactic foam resin, said elastomer modified foam resin containing from about 5 wt. % to about 30 wt. % glass microballoons and having a cured density in the range of about 0.75 to 1.0 gm/cc, said reinforcing fabric having fibers oriented at 0° and 90° with respect to the longitudinal axis of the ski body, at least two laminae of said fiberglass reinforcing fabric extending the full length of the ski body and at least two laminae of foam resin on the exterior of the ski body and extending the full length of the ski body, the balance of the laminae being of shorter lengths so as to define said pedestal.

8. The ski body of claim 7 wherein there are about 13 plies of alternate laminae at the pedestal portion of the ski and at least 2 plies at the head and toe portions of the ski.

9. The ski body of claim 8 wherein the elastomer modified foam resin is an epoxy resin.

10. A ski body having a pedestal and a head and toe section, said ski body comprising:
a plurality of plies of alternating laminae of fiber reinforcement and elastomer modified syntactic foam;
said laminae of fiber reinforcement being woven fiberglass fabric, the fibers of which are oriented at 0° and 90° with respect to the longitudinal axis of the ski body;
said elastomer modified syntatic foam being an epoxy foam resin containing from about 5 wt. % to about 30 wt. % of glass microballoons and having a cured density in the range of about 0.75 to 1.0 gm/cc;
at least two laminae of said foam being on the exterior of said ski body and for the full length thereof;
at least two laminae of fiber reinforcement extending the full length of the ski body; and,
the balance of alternating laminae of fiber and foam being interposed between the laminae of fiber extending the full length of the ski so as to define a contoured ski body having a pedestal.

11. The ski body of claim 10 wherein the epoxy resin in a condensation product of expichlorohydrin and bisphenol-A modified with carboxyterminated polybutadiene acrylonitrile rubber.

12. The ski body of claim 11 wherein said syntactic foam resin has a cured density of about 0.80 to 0.95 gm/cc.

13. A method of forming a ski body comprising: arranging alternate laminae of glass fiber reinforcing material and an elastomer modified syntactic foam resin in a mold, said mold having the contour of a ski, said foam resin being an elastomer modified epoxy foam containing from about 5 wt. % to about 30 wt. % glass microballoons and having a cured density of from about 0.5 to about 1.0 gm/cc, said fiber reinforcing material being arranged at angles of 0° and 90° with respect to the longitudinal axis of the ski, at least two laminae of said fiber reinforcing material extending the entire length of the ski, at least two laminae of resin so arranged so as to be on the exterior surfaces of the ski body and extending the full length thereof, shorter lengths of laminae arranged progressively upwardly in the mold toward the top laminae such that the number of laminae in the toe and head portion of the ski are less than the number of laminae in the pedestal portion of the ski whereby the laminae follow the general contour of the ski body; heating such arranged laminae of fiber reinforcing material and resin whereby the resin is cured.

14. The method of claim 13 wherein said fiber reinforcing material is woven fiberglass.

15. A method of forming a matched pair of skis comprising: forming a ski billet at least twice the width of a single ski and having the requisite length and contour of a ski by placing in a mold having the requisite length, width and contour a first layer of parting agent extending the full length of the mold, at least two layers of elastomer modified foam sheet material extending the full length of the mold, a layer of fiber reinforcing sheet material extending the full length of the mold; thereafter arranging alternate layers of foam sheet material and fiber reinforcing material of incrementally shorter lengths to provide a changing contour having a maximum thickness to define a pedestal; placing a full length of fiber reinforcing material and foam resin sheet material on top of the alternating laminae, each laminae of fiber reinforcing material having fibers oriented at 0° and 90° with respect to the longitudinal axis of the mold, each laminae of foam resin sheet material containing about 5 wt. % to about 30 wt. % glass microballoons and having a cured density of from about 0.75 to about 1.0 gm/cc; heating the resin in the range of about 250° F to about 300° F to cure the resin; removing the billet and cutting the billet to provide a matched pair of skis.

16. The method of claim 17 wherein said foam sheet material is an elastomer modified epoxy.

17. The method of claim 16 wherein metal edges are bonded to said skis and thereafter a sheet of high density polyethylene is bonded to the bottom of the skis and a sheet of plastic film is bonded to the top of the skis.

* * * * *